Jan. 31, 1928.
W. H. B. PERRY
SAW TOOTH
1,657,481
Filed Feb. 10, 1923
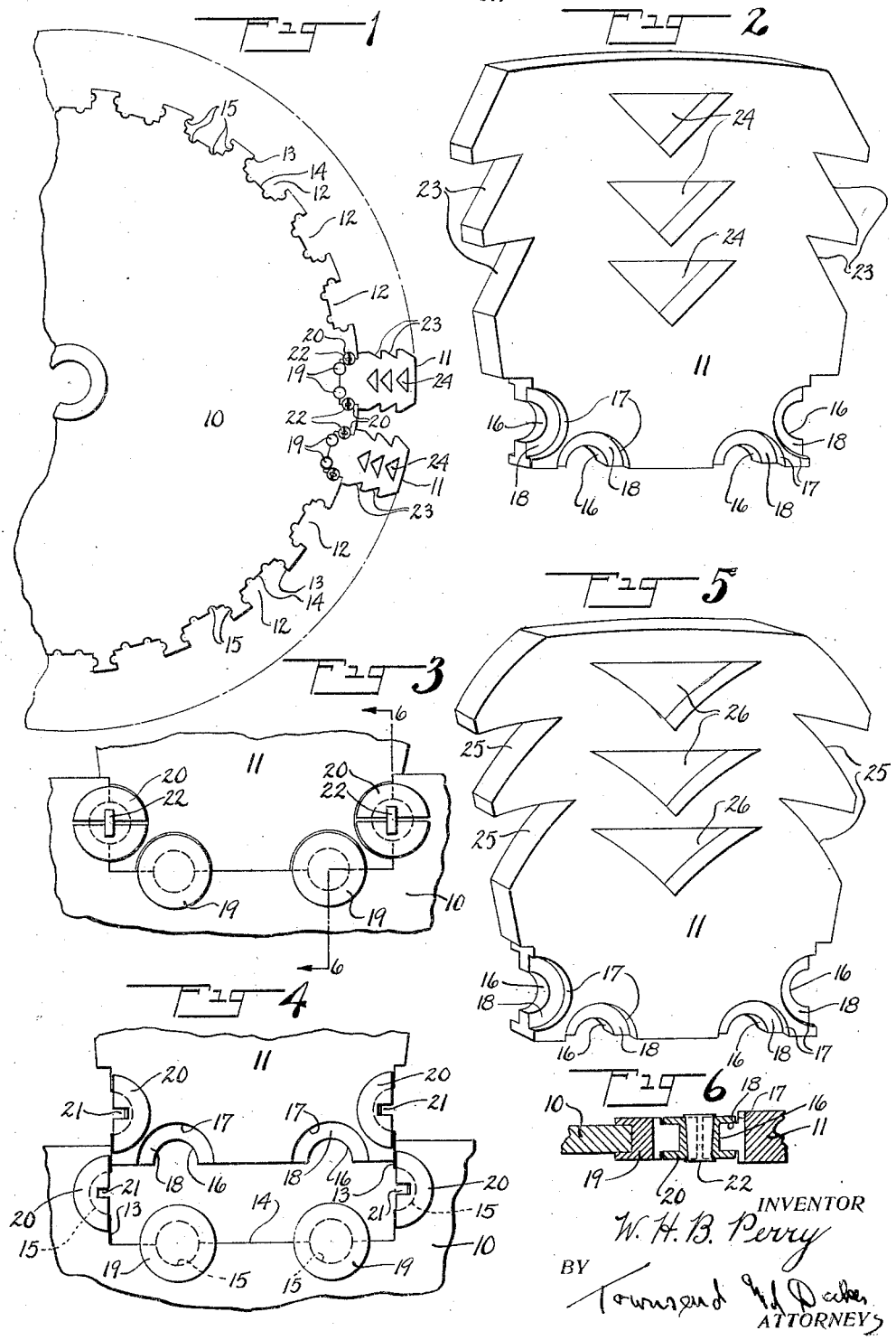
INVENTOR
W. H. B. Perry
BY
Townsend
ATTORNEYS Patented Jan. 31, 1928.

1,657,481

UNITED STATES PATENT OFFICE.

WILLIAM H. B. PERRY, OF WATERBURY, VERMONT.

SAW TOOTH.

Application filed February 10, 1923. Serial No. 618,224.

My invention relates to a saw tooth and aims to provide a device of this nature which is particularly adapted for use in connection with the cutting of granite, marble or other hard substances of a similar nature.

It is an object of the present invention to provide a device of the character stated which may be utilized in connection with either a saw blade of the reciprocating of rotating type and which will be removable from said blade.

A further object of my invention is that of providing a tooth of extremely simple construction, together with means whereby the same may readily be detached from, or associated with the blade and further by means of which, when the tooth is in attached position, the latter will form a unit rigid with the blade.

A still further object of this invention is that of constructing a tooth for a saw in which the shot (abrasive, such as, carborundum, crushed steel, chilled shot etc.) will readily feed into the cut with a minimum of attention on the part of the operator.

Another object of my invention is that of furnishing a tooth of the type noted, which will be so constructed as to furnish long service and which will require no re-shaping, filing, adjusting or similar operations until it is completely worn out, at which time it may be removed from the blade and discarded.

With these and further objects in mind, reference is had to the attached sheet of drawings which illustrate practical embodiments of my invention and in these drawings it will be seen that:

Fig. 1 is a fragmentary side elevation of a rotary type of saw blade upon which there are mounted two teeth embodying my improved construction.

Fig. 2 is a perspective view of one of these teeth.

Fig. 3 is a fragmentary side view of the lower end of a tooth and showing the same attached to a blade.

Fig. 4 is a view similar to Figure 3 but showing the position which the parts assume when the tooth is partially mounted.

Fig. 5 is a perspective view similar to Figure 3 but exemplifying a slightly different form of construction than that embraced in the figure last referred to and, Fig. 6 is a transverse sectional view taken along the lines 6—6 and in the direction of the arrows indicated in Figure 3.

It will be noted that in Figures 1, 3, 4 and 6, the reference numeral 10 indicates the body of the blade which may be of any standard material and any desirable type and mounted upon this blade are a series of teeth embracing bodies 11 which are preferably of a greater thickness than the thickness of the blade 10 as has been clearly brought out in Figure 6.

The mounting of the teeth upon the blade may be accomplished in any desired manner but with a view of insuring the greatest rigidity at this point, I prefer to form the edge of the blade with a plurality of recesses 12 corresponding in number to the number of blades employed, it being noted that these recesses each preferably present relatively straight, side and bottom edges 13 and 14 respectively, which are disposed substantially at right-angles to each other and conform to the side edges and the base portion of the tooth. In the side edges and base of each of these recesses, I provide cut-out portions 15 which are preferably semi-circular and corresponding cut-out portions 16 are formed in the side and rear edges of each tooth base. Further, it will be seen that adjacent the cut-out portions 16 of each of the teeth a further cut is made on each face of the tooth to provide shoulders 17 concentrically disposed with respect to the base of the cut-out portion 16, adjacent to which they are provided and thus there is formed a ridge 18 which is of a thickness equal to that of the blade 10.

In applying the tooth to the recess 12 with which it is to be associated, I prefer primarily to fit spools 19 to the cut-out portions 15 in the base edge 14 of the recess, these spools in the present embodiment of the invention being of a conventional type and embracing a body formed with heads at both ends. Half of each head of the spool while in this position, will overlap the opposite faces of the blade 10 and upon the tooth 11 being applied to the recess the other half of each head of the spool will bear against the side faces of the ridge 18 and the shoulders 17, while the body of the said spool will rest within the cut-out portion 16.

In this position, it will be obvious, that any lateral motion on the part of the teeth with respect to the blade, will be absolutely prevented and with a view of providing means which will prevent any outward movement of the tooth, it will be noted that I utilize further spools 20, which correspond in all particulars to the spools 19, with the exception that the former are split and each of the sections thereof is provided with a tapered groove 21 in its straight edge. Prior to the application of the tooth to the blade, or when the parts are in the position shown in Figure 4 one spool section is associated with each of the cut-out portions 15 in the side edges of the recess 12 and the second section of each spool is applied to the cut-out portions 16 in the side edges of the tooth body 11, as has best been shown in the figure afore referred to and the tooth may now be brought to extend fully into the recesses in which position the grooves 21 of the spool sections 20 align with each other and when this occurs these spool sections may be rotated as a unit with respect to the tooth and blade, so that the straight edge sections of the same extend substantially parallel to the rear edges of the tooth and recess and when the parts reach this position a suitable wedge 22 may be driven into the grooves 21 to force the sections of the spool 20 in opposite directions and to tightly lock them against further movement and it will be noted that the inner end of the wedge may be headed to prevent any accidental removal of the same from this position. Thus, the spool sections will effectually lock the tooth in place and any movement of this latter member with respect to the blade is prevented incident to the fact that first, the split portion of the spool 20 is at right angles to the side edges of the blade, and secondly, a rotative movement of these spool sections is counteracted, incident to the manner in which they are wedged in place, which latter expedient also prevents any chattering of the parts.

With reference to the detailed construction of the tooth, it will be seen that the body of the same has its side edges notched as at 23, to provide a series of feeding edges and a number of preferably triangular openings 24 may be formed in the body 11 of the tooth, which openings correspond in number preferably to the number of feeding edges provided by the notches 23 and although these notches and openings may present straight edged portions as in Figure 2, I prefer in most instances to form the body of the blade as in Figure 5, with notches 25 and openings 24, which, although conforming to the notches and openings aforementioned, have their edges curved.

Thus, it will be understood, that a tooth such as has been shown in either of Figures 2 or 5 is an extremely desirable member, in that the abrasive material, or other cutting substance, readily works under the cutting edge as the saw moves, which is particularly apparent in the instances of the notches and openings presenting curved edges, such as in Figure 5 and also due to the double ended construction of the tooth, the latter may be worked in either direction with ease and facility and may also be optionally applied to either a reciprocating or rotating type of blade. Further, it will be seen that as the cutting edge of the saw tooth is worn down, the outermost opening through the body of the tooth will serve to properly feed the abrasive so that no attention on the part of the operator will be necessary until the tooth is completely worn out. Further, when the tooth has become worn out and it is necessary to remove the tooth, this removal may readily be accomplished by simply withdrawing the wedges 22 from the grooves 21 of the spool 20 subsequent to which the latter may be turned in any suitable manner, such as, for example, by inserting a screwdriver into the grooves and twisting the spools to a point at which the tooth may readily be removed as has been shown in Figure 4.

Thus, it will be understood, that all the objects of this invention have been accomplished and it will be appreciated that numerous modifications of construction may be resorted to without in the slightest departing from the spirit of my invention as defined by my claims.

Having described my invention, what I claim as new and desire to secure by Letters Patent, is:—

1. A saw tooth, including a body having sides, each provided with a plurality of notches, said notches having an obliquely inclined cutting edge whereby abrasive material readily works under the same to produce a cutting action, and a feeding edge adjacent its outer end, said feeding edge being curved.

2. A saw tooth including in combination a blade formed with a recess, a tooth body adapted to extend into said recess, the edges of said body and recess being formed with cut-out portions and a spool adapted to lie within said cut-out portions, said spool comprising a plurality of sections, formed with grooves and a wedge member adapted to be projected into said grooves.

Signed at Waterbury, in the county of Washington and State of Vermont, this 5th day of February A. D. 1923.

WILLIAM H. B. PERRY.